Figure 3:
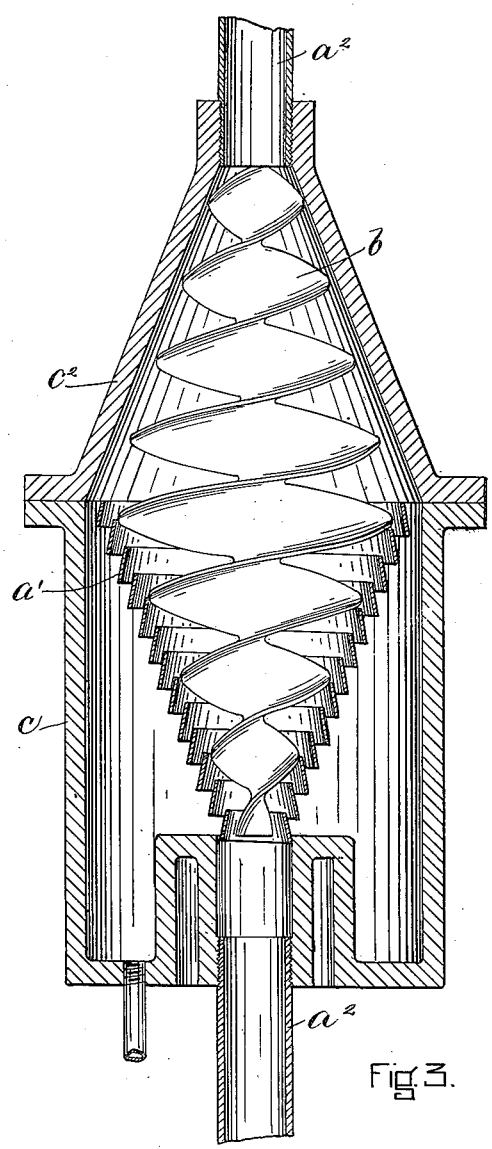

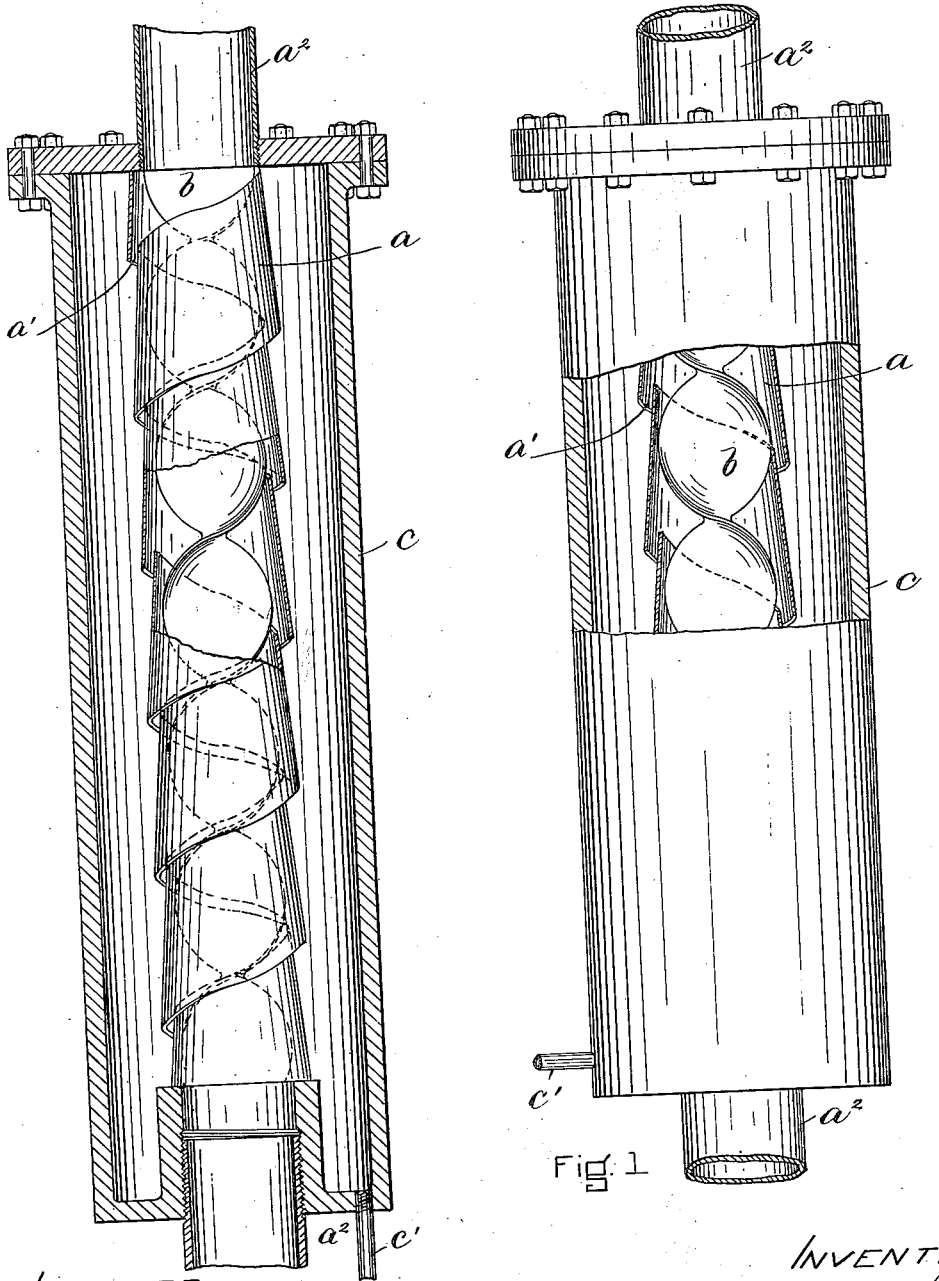

(No Model.) 3 Sheets—Sheet 2.

C. D. MOSHER.
STEAM SEPARATOR.

No. 472,310. Patented Apr. 5, 1892.

WITNESSES.
H. A. Hall.
A. D. Harrison.

INVENTOR.
C. D. Mosher
by Wight Brown Crossley
Attys.

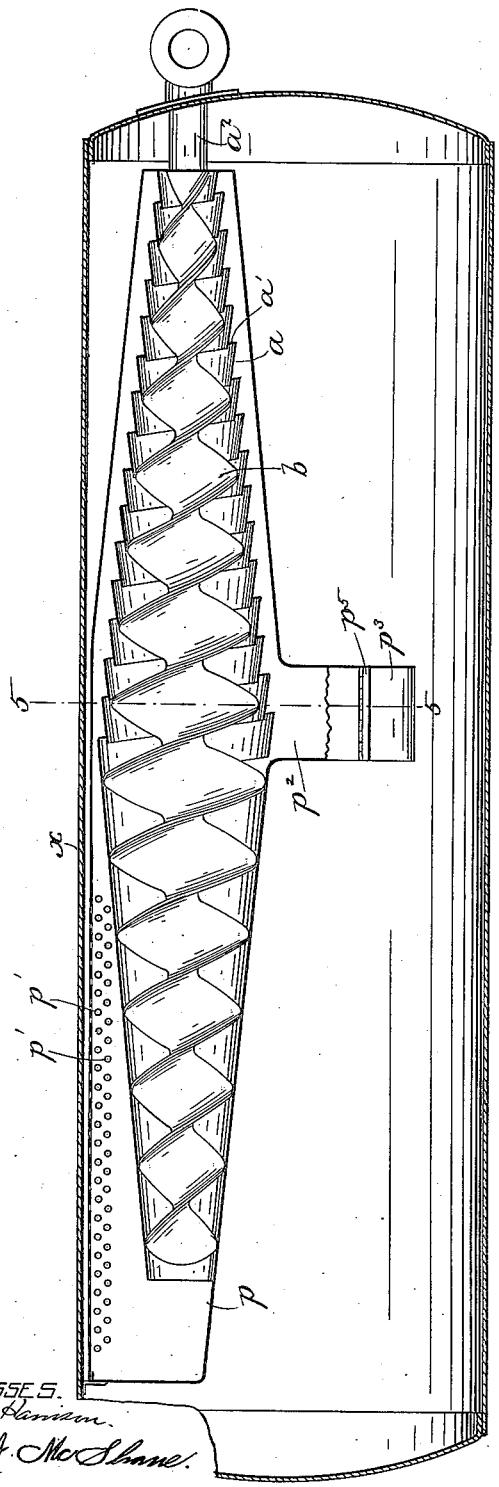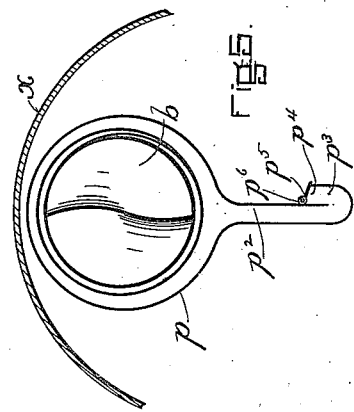

UNITED STATES PATENT OFFICE.

CHARLES D. MOSHER, OF AMESBURY, MASSACHUSETTS.

STEAM-SEPARATOR.

SPECIFICATION forming part of Letters Patent No. 472,310, dated April 5, 1892.

Application filed January 4, 1892. Serial No. 416,976. (No model.)

*To all whom it may concern:*

Be it known that I, CHARLES D. MOSHER, of Amesbury, in the county of Essex and State of Massachusetts, have invented certain new and useful Improvements in Steam-Separators, of which the following is a specification.

This invention relates to that class of steam-separators which include a conduit or casing through which the steam passes, a helical blade or diaphragm in said conduit dividing the latter into two parts and giving a gyratory motion to the steam passing through the conduit, and an outlet for the escape of the entrained water separated from the steam by the gyrating motion thereof. In a separator of this class previously made by me the outlet of the conduit has been a straight slot extending lengthwise of the conduit at the lower side thereof, the conduit being in a horizontal position and made in substantially scroll shape in cross-section, the edges of the scroll overlapping to form the outlet. A separator of this construction, having the outlet at one side only of the conduit, must necessarily be used in a substantially horizontal position in order that the outlet may be at the portion of the conduit where it will be the most effective.

The present invention has for its object to provide a separator of the class above described, adapted to be used in either horizontal position or vertical position or any intermediate position, as the requirements of the case may demand.

The invention consists in a separator of the class above described in which the steam-conduit is provided with a water-outlet, which is a helical slot instead of being a straight slot, as heretofore, said helical slot, by reason of the fact that its convolutions encircle the helical diaphragm, enabling the conduit to stand in any desired position, the improvement being especially adapted to separators which are used in a vertical position.

The invention also consists in certain incidental improvements, all of which I will now proceed to describe and claim.

Of the accompanying drawings, forming part of this specification, Figure 1 represents a side view of a separator embodying my invention, a portion of the separator being shown in section. Fig. 2 represents a longitudinal section of the casing of the separator and a side elevation of the steam-conduit, the latter being partly broken away to show the helical diaphragm within it. Fig. 3 represents a longitudinal section of a separator of somewhat different form from that shown in Figs. 1 and 2. Fig. 4 represents a sectional view of a boiler having my improved separator. Fig. 5 represents a section on line 5 5, Fig. 4.

The same letters of reference indicate the same parts in all the figures.

In the drawings, $a$ represents a steam-conduit, which is provided with a helical slot or outlet $a'$, extending throughout the greater portion of its length. The conduit is preferably formed by bending a strip of metal of suitable length into the helical form shown in Figs. 1 and 2, the convolutions being preferably somewhat tapered and arranged so that the larger end of each convolution slightly overlaps the adjacent end of the next convolution, said overlapping ends being separated by a helical space, which constitutes the helical outlet $a'$. My invention is not limited to this particular construction, however, as the helical outlet may be formed in any other suitable way. I regard it as desirable, however, that one of the two sides of the slot shall overlap the other, so that there will not be a direct outlet from the interior of the conduit, one of the sides of the slot constituting a "baffle-plate," so to speak, which causes anything escaping from the interior of the conduit to be deflected laterally.

$b$ represents the helical blade or diaphragm, which extends throughout the length of the conduit and subdivides it into two parts. Said diaphragm is preferably made by twisting a strip of metal into a shape resembling that of an auger-blade, the width of said strip being such as to extend nearly or quite across the narrower portions of the interior of the conduit. The diaphragm by its helical form gives a gyrating motion to the steam passing through the conduit, so that the entrained water carried by the steam is thrown outwardly by centrifugal action and escapes through the helical outlet $a'$, the escape of the water being facilitated by the described form of the outlet, resulting from the overlapping of the edges or surfaces which constitute the sides of the outlet, the inner edge of the opening being in a position to deflect outwardly any water that may fall between it and the outer edge, particularly when the conduit is placed in a vertical position.

It will be seen that the helical form of the outlet particularly adapts the separator for use in a vertical position, all parts of the outlet being equally effective when the separator is used in said position. The separator may, however, be used in a horizontal or any other position, if desired, the helical outlet being reasonably effective when the conduit is in a horizontal position, although not so effective as when the conduit is in a vertical position.

The entrained water escaping through the helical outlet may be caught in a casing or receptacle $c$, surrounding the conduit, said casing being supported in any suitable way—as, for example, by the sections $a^2$ of the steam-pipe, between which the conduit $a$ is placed. I have here shown the heads of the casing $c$ attached to the said sections $a^2 a^2$. The lower portion of the casing $c$ should have an outlet $c'$ for the escape of the entrained water, said conduit being preferably controlled by a trap of any suitable description. In Fig. 3 I have shown the casing $c$ as made of tapering form at its upper portion, as indicated at $c^2$, the smaller end of said tapering portion being fixed to one of the sections $a^2$. In this case the portion of the conduit having the helical outlet $a'$ is also made of tapering form, this taper being the reverse of the tapering portion of the casing. The larger end of the helically-slotted portion is placed adjacent to the larger end of the tapering portion of the casing, the two collectively forming a conduit which gradually increases in size from its ends to its central portion, one part of the conduit—namely, that which is composed of the tapering portion $c^2$ of the casing—being solid or imperforate, while the other portion is helically slotted, the latter being surrounded by the cylindrical portion of the casing. The helical diaphragm $b$ is in this case formed to correspond to the shape of the conduit, its width gradually increasing from its ends to its center.

The gradual enlargement of the conduit and of the helical diaphragm from the receiving end to the central portion and the gradual contraction of said parts from the central portion to the delivering end cause the volume of the steam to expand and its speed to be correspondingly retarded. It is found in practice that this expansion of the volume and decrease of the speed of the steam has an important influence on the separation of the entrained water and the deposition of said water on the walls of the conduit at the largest portion thereof and between the largest portion and the contracted delivery end, the separation and deposition of the entrained water being much more thorough than it would be if the conduit and diaphragm were of uniform diameter from end to end.

In Fig. 4 I show an adaptation of my improved separator enlarged at its central portion to a boiler $x$, the separator being placed in a casing $p$, having numerous steam-receiving perforations $p'$ in its upper portion over that part of the conduit between the receiving end and the enlarged central portion, said casing having a water-outlet $p^2$ in its lower portion. The lower end of the outlet $p^2$ enters a receptacle or trap $p^3$, which holds water around said outlet for the purpose of preventing the escape of steam. The expanding portion of the conduit is made without the helical outlet-slot, and said slot is made in the contracting portion of the conduit—viz., that portion between the enlarged center and the delivering end.

The trap $p^3$ is here shown as an enlargement of the outlet $p^2$, and constitutes a receptacle partially subdivided by one of the side pieces of said outlet, as shown in Fig. 5. The trap has an outlet-opening at $p^4$ above the lower end of said side piece, and said opening is normally closed by an upwardly and outwardly opening valve $p^5$, hinged at $p^6$. Said valve opens to permit the escape of water from the trap, but prevents the entrance of water from the boiler into the casing $p$ through the trap. The object of this valved trap is to prevent water from being drawn from the boiler into the casing or conduit under any circumstances.

I claim—

1. A steam-separator comprising in its construction a steam conduit or passage having a helical slot formed with overlapping edges, and a helical diaphragm or partition extending through said conduit and subdividing it into two parts, said diaphragm being formed to give a gyrating movement to steam passing through the conduit, while the helical slot in said conduit furnishes an outlet for the entrained water thrown outwardly by the centrifugal action of the gyrating steam, as set forth.

2. A steam-separator comprising in its construction a steam conduit or passage having a helical slot formed with overlapping edges, a helical diaphragm or partition extending through said conduit and subdividing it into two parts, said diaphragm being formed to give a gyrating movement to steam passing through the conduit, while the helical slot in said conduit furnishes an outlet for the entrained water thrown outwardly by the centrifugal action of the gyrating steam, and a casing or water-receptacle surrounding said conduit and provided with a suitable outlet, as set forth.

3. A steam-separator comprising in its construction a conduit which is enlarged at its central portion and contracted from said central portion toward its ends, and a correspondingly enlarged and contracted helical diaphragm in said conduit adapted to impart a gyrating motion to steam passing therethrough, the enlargement of the conduit causing an expansion of the volume of the steam and facilitating the deposition of the entrained water on the walls of the conduit, as set forth.

4. A boiler or other receptacle and a casing located in the upper portion of the boiler and provided in its upper portion with steam-inlets, and at its lower portion with a downwardly-extending outlet having a trap and a valve covering the mouth of said trap, said valve being arranged to permit the escape of water from the trap into the boiler and to prevent the entrance of water from the boiler into the trap, combined with a steam-separator in said casing and a steam-outlet connected with said separator, as set forth.

In testimony whereof I have signed my name to this specification, in the presence of two subscribing witnesses, this 4th day of November, A. D. 1891.

CHARLES D. MOSHER.

Witnesses:
C. F. BROWN,
A. D. HARRISON.